United States Patent [19]

Morisawa et al.

[11] Patent Number: 5,708,472
[45] Date of Patent: Jan. 13, 1998

[54] OPTICAL IMAGE RECORDING AND READING APPARATUS

[75] Inventors: Tahei Morisawa; Harumi Aoki, both of Tokyo, Japan

[73] Assignee: Asahi Kogaku Kogyo Kabushiki Kaisha, Tokyo, Japan

[21] Appl. No.: 550,636

[22] Filed: Oct. 31, 1995

[30] Foreign Application Priority Data

Nov. 10, 1994 [JP] Japan .................................. 6-301466

[51] Int. Cl.$^6$ ............................................. H04N 5/225
[52] U.S. Cl. ............................ 348/373; 348/220; 348/207
[58] Field of Search .............................. 348/207, 96, 97, 348/98, 99, 209, 373, 374, 375, 376; 358/335, 471, 472, 474, 482, 483; 386/38, 117, 118; H04N 5/225

[56] References Cited

U.S. PATENT DOCUMENTS 4,953,029  8/1990  Morimoto et al. ...................... 348/64
5,191,408  3/1993  Takanashi et al. ...................... 348/207

FOREIGN PATENT DOCUMENTS 1-321783  12/1989  Japan .............................. H04N 5/225

*Primary Examiner*—Andrew Faile
*Assistant Examiner*—Tuan V. Ho
*Attorney, Agent, or Firm*—Greenblum & Bernstein, P.L.C.

[57] ABSTRACT

An optical image recording and reading apparatus includes a camera having an optical system which forms a focused image of an object at a predetermined position, and a holder and a scanner which can be selectively mounted to the camera portion. The holder and scanner have a common holding mechanism which holds an electronic development type recording medium on which a visible image is formed upon photographing without any need for chemical treatment after exposure so, that a light receiving surface of the recording medium can be located at the predetermined position. The scanner further has an image reading mechanism which reads an image developed on the recording medium.

14 Claims, 8 Drawing Sheets

OPTICAL IMAGE RECORDING AND READING APPARATUS

BACKGROUND OF THE INVENTION

1. Field of the Invention

The present invention relates to an optical image recording and reading apparatus which records an optical image, formed by a photographing lens, as a visible image and reads an optical image recorded therein.

2. Description of Related Art

It is known to use a silver halide photographic material as an optical image recording material, since it exhibits a high photosensitivity and resolution, and can be obtained at a low cost. However, a troublesome developing process is required and a visible image cannot be obtained at the time of photographing.

To simplify the developing process, a dry process has been proposed. However, even in the proposed dry process, an instant development is not possible, that is, an image cannot be viewed during the photographing operation. Numerous other photographic materials are known, including electronic photographic materials, diazo photographic materials, or free radical photographic materials etc., however, none of these have the same optical properties as those belonging to the silver halide photographic material. Moreover, instant development is not possible using these photographic materials. Note that since electronic photographic materials can be developed using the dry process and that an electrostatic latent image obtained by the exposure can be immediately developed using toner, etc., electronic photographic materials have been widely used, mainly in copying machines.

In electronic photographing technology, a photographic material from which a recording medium is made has been proposed, wherein the recording medium itself can be directly electronically developed and a developed visible image thereof can be immediately obtained without any chemical operation. Note that in this specification the recording medium which can be electronically developed is referred to as an electronic development type recording medium.

In Japanese Unexamined Patent Publication No. 5-2280, for example, a recording medium is disclosed which is comprised of an electrostatic data recording medium and an electric charge holding medium in combination. The electrostatic data recording medium is provided with a photoconductive layer and an inorganic oxide layer, and the charge holding medium is provided with a liquid crystal display element. In this arrangement, if the electrostatic data recording medium is exposed while a voltage is applied between the electrostatic data recording medium and the charge holding medium, electric charges, corresponding to the quantity of light to be incident thereupon, are produced. The intensity of an electric field to be applied to the liquid crystal display element, opposed to the electrostatic data recording medium, varies depending on the electric charges produced, and hence, an image corresponding to the distribution of the quantity of light is displayed in the liquid crystal display element, i.e. it has been developed.

Japanese Unexamined Patent Publication No. 5-150251 discloses a dispersive liquid crystal display element in which the image displayed on the liquid crystal display element can be maintained even after the electric field, to be applied thereto, has been removed.

Despite the merits disclosed in the above publications, there is no electronic photographic material which can be immediately or instantaneously developed, and that can be applied to a camera or other optical instruments. A need has arisen to provide an apparatus can record and read an optical image on and from the electronic photographic material.

SUMMARY OF THE INVENTION

It is an object of the present invention to provide an optical image recording and reading apparatus in which optical images can be recorded on and read from an electronic development type recording medium.

To achieve the object mentioned above, according to the present invention, there is provided an optical image recording and reading apparatus comprising a camera portion having an optical system which forms a focused image of an object at a predetermined position, a holder which can be mounted to the camera portion, the holder having a holding mechanism which holds an electronic development type recording medium, so that a light receiving surface of the recording medium can be located at the predetermined position. The said electronic development type recording medium comprises a medium on which a visible image is formed upon photographing without any need for chemical treatment after exposure. A scanner can be mounted to the camera portion, the scanner having a holding mechanism which holds the electronic development type medium, so that a light receiving surface of the recording medium can be located at the predetermined position. An image reading mechanism reads an image developed on the recording medium held at the holding mechanism of the scanner. The holder and the scanner can be selectively mounted to the camera portion.

The present disclosure relates to subject matter contained in Japanese Patent Application No. 6-301466 (filed on Nov. 10, 1994) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
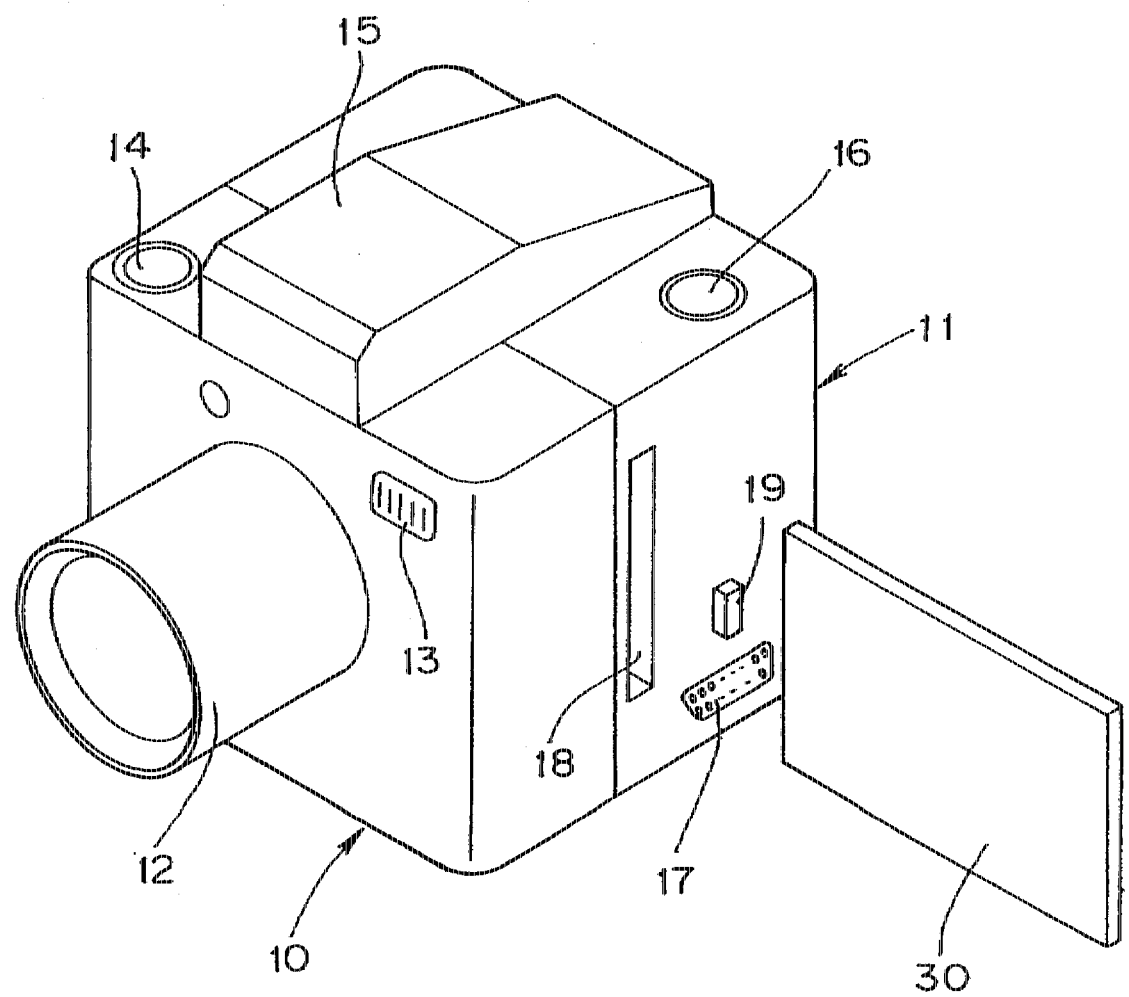
FIG. 1 is a perspective view of a still video camera to which the present invention is applied.

FIG. 1 shows an embodiment of a still video camera according to the present invention.

The still video camera includes a single lens reflex type camera portion 10 and a scanner 11 detachably attached thereto. In place of the scanner 11, a holder can be attached to the camera portion 10, as will be described hereinafter.

As viewed from the front of the camera portion 10, there is a photographing optical system 12 having a photographing lens located, substantially, in the central part of the camera portion. A strobe 13 is provided above and to the right of the photographing optical system 12. There is a release switch 14 on the upper surface of the camera portion, provided on the opposite side of the strobe 13. A finder 15 is provided on the central portion of the upper surface of the camera portion 10, extending from the front of the upper surface of the camera portion 10 to the rear of the upper surface of the scanner 11. The scanner 11 is provided, on the upper surface thereof with a scanning start switch 16 on one side of the finder 15. The scanner 11 is provided, on the lower portion of the side surface thereof, with an output terminal 17 from which an image signal is output to an external recording device, for example. The image signal corresponds to an optical image which is obtained by the the camera portion. Also the scanner 11 is provided on the side surface thereof with a slot 18 in which an electronic development type recording medium 30 can be fitted. An ejection switch 19 is provided in the vicinity of the slot 18, which is depressed to eject an already inserted electronic development type recording medium 30 therefrom.

Figure 2:
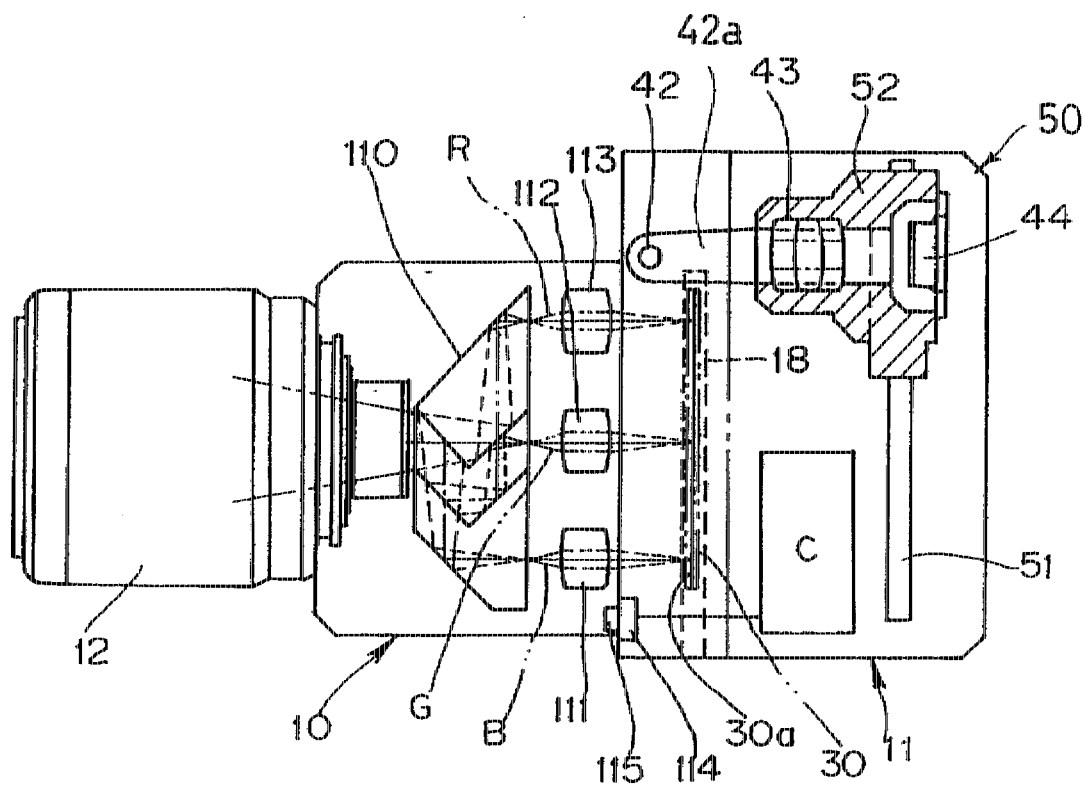
FIG. 2 is a schematic view of an internal structure of a still video camera having a scanner mounted to a camera portion thereof.
Figure 3:
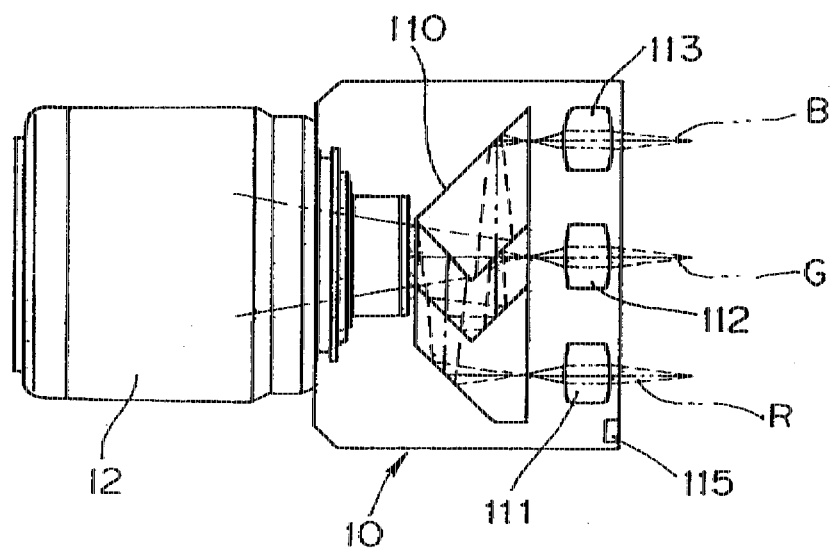
FIG. 3 is a schematic view of a still video camera with the scanner removed.

FIG. 2 shows the internal structure of a still video camera having a scanner 11 attached to the camera portion 10, and FIG. 3 shows the internal structure of a still video camera when the scanner 11 is removed.

In the camera portion 10 a color separation prism 110 is provided behind the photographing optical system 12. Light reaching the color separation prism 110, through the photographing optical system 12, is separated into three primary colors, i.e. red R, green G, and blue B, and is then emitted from the color separation prism 110. The images thus obtained through the photographing optical system 12 are focused at points located in the vicinity of the emission surface of the color separation prism 110 and are thereafter focused again at points on the light receiving surface 30a of the electronic development type recording medium 30 (already inserted in the scanner 11), by three relay lenses 111, 112 and 113 provided at the rear of the color separation prism 110. Thus, images of R, G and B are formed on the light receiving surface 30a.

As can be seen from the foregoing, the images are formed at predetermined image forming positions located outside the camera portion 10. The scanner 11 is attached to the camera portion 10 so that the light receiving surface 30a, of the electronic development type recording medium 30 inserted in the scanner 11, is located at the image forming positions.

The internal structure of the scanner 11 will be discussed below referring to FIGS. 2, and 4 through 6.

The photographed image is developed on the electronic development type recording medium 30 as a visible image which can be read and recorded as digital data by driving the scanner 11.

The scanner 11 is provided with a light source 42 which emits illuminating light onto the electronic development type recording medium 30. The light source 42 is mounted to a moving mechanism 52 which is movable along a guide shaft 51, through a mounting bar 42a. The light source 42 is located nearer to the camera portion 10 than the electronic development type recording medium 30. The moving mechanism 52 is provided with a scanning optical system 43 and a line sensor 44. The scanning optical system 43 and the line sensor 44 are located on the opposite side of the light source 42 with respect to the electronic development type recording medium 30. The scanning optical system 43 is disposed in the optical path of the light emitted by the light source 42 and transmitted through the electronic development type recording medium 30. The line sensor 44 is located at an image forming surface at a position where the images are formed by the scanning optical system 43. The light source 42 is, for example, comprised of a plurality of LED's aligned in a row and a collimating lens which collimates the light emitted from the LED's, so that the recording medium 30 is illuminated by the collimated light flux. The line sensor 44 extends in a direction parallel with the aligned row of LED's.

When the moving mechanism 52 is moved along the guide shaft 51, the light source 42 is moved along the electronic development type recording medium 30. The scanning optical system 43 and the line sensor 44 are moved together with the light source 42. Namely, the images on the electronic development type recording medium 30, which is illuminated with the beams of light emitted from the light source 42, are formed on the light receiving surface of the line sensor 44 by the scanning optical system 43. Thus, the light source 42, the guide shaft 51 and the moving mechanism 52 constitute a sub-scanning mechanism 50 which is adapted to make the line sensor 44 scan in the direction perpendicular to the longitudinal direction thereof. Note that, upon photographing, the light source 42 is retracted from the optical path (the area between the relay lenses 111, 112, 113 and the electronic development type recording medium 30) so as not to interfere in the optical path.

A control circuit (controller) C is connected to another control circuit (not shown) provided in the camera portion 10, through connectors 114 and 115 to read the image signals produced in the line sensor 44.

Figure 4:
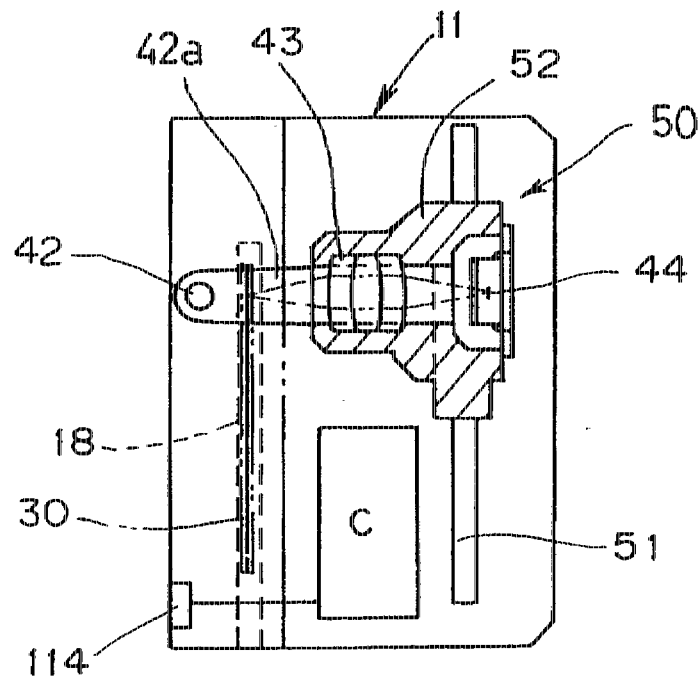
FIG. 4 is a plan view of a scanner in which an image of an electronic development type recording medium is being read.
Figure 5:
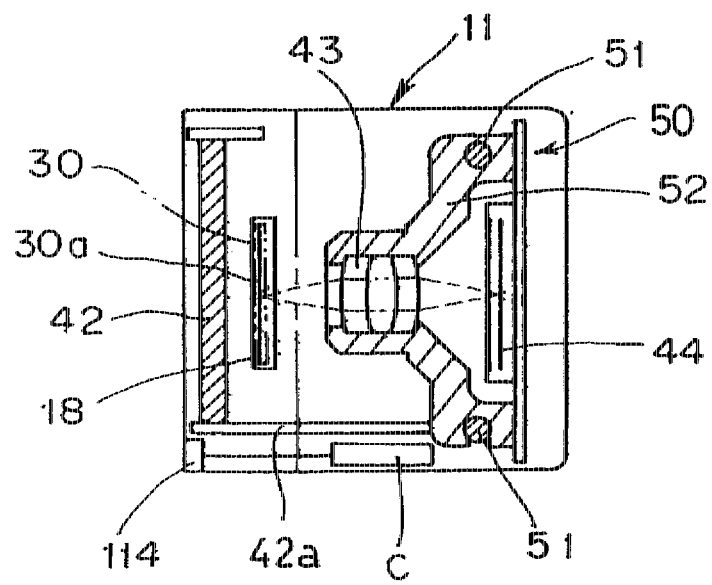
FIG. 5 is a side view of a scanner showing the internal structure thereof.
Figure 6:
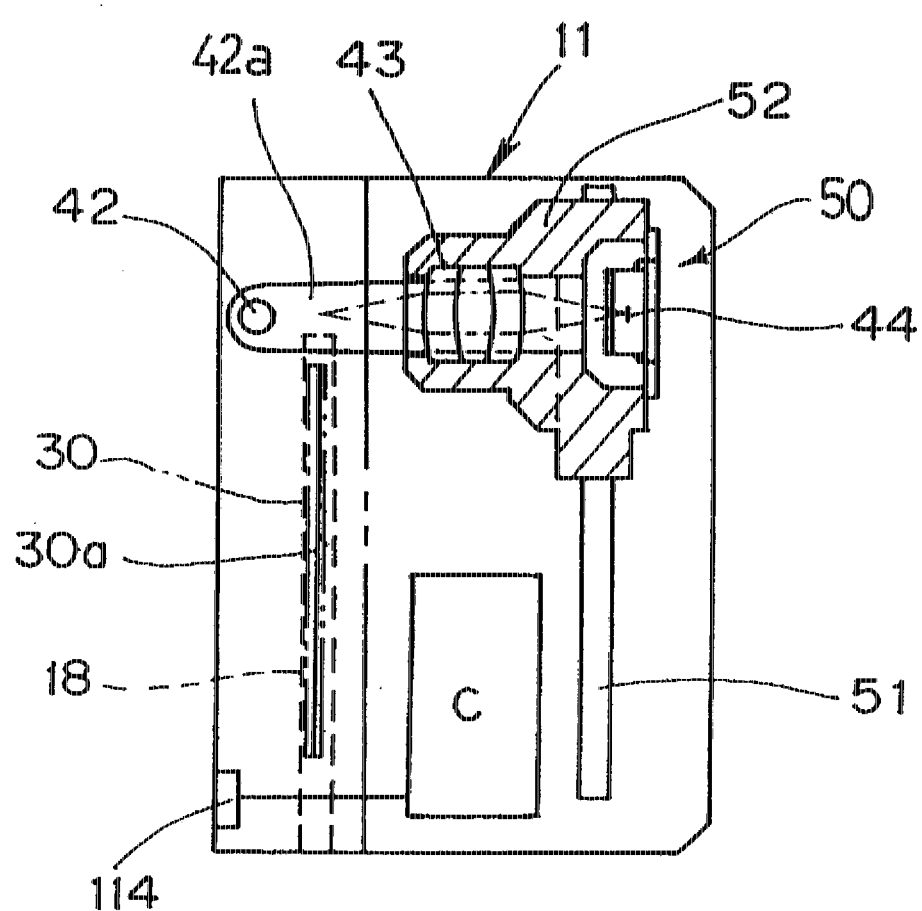
FIG. 6 is a plan view of a scanner in which an image of an electronic development type recording medium is not being read.

Note that the scanner 11 even when detached from the camera portion 10, as shown in FIGS. 4 through 6, can still be used.

To read the images recorded on the electronic development type recording medium 30, the moving mechanism 52 is moved along the electronic development type recording medium 30 at a predetermined pitch in accordance with control commands from the controller C. Namely, the line sensor 44 is moved intermittently by a predetermined displacement at a predetermined interval to scan the image forming surface of the scanning optical system 43 to thereby read the images recorded on the electronic development type recording medium 30. Note that the light source 42 is retracted from the electronic development type recording medium 30, as shown in FIG. 6, when the scanner 11 is not used.

Figure 7:
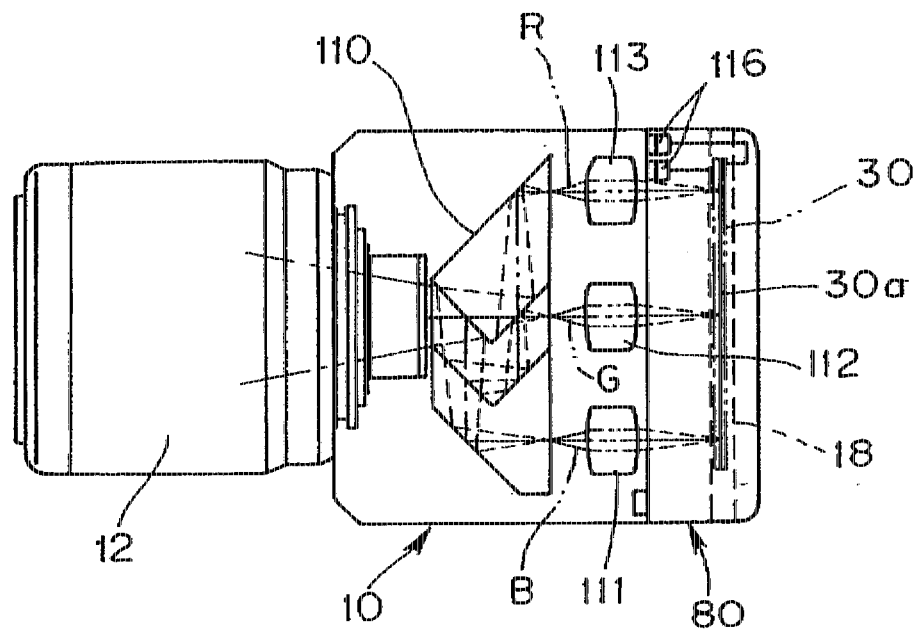
FIG. 7 is a plan view of a still video camera having a holder attached thereto showing the internal structure thereof.
Figure 8:
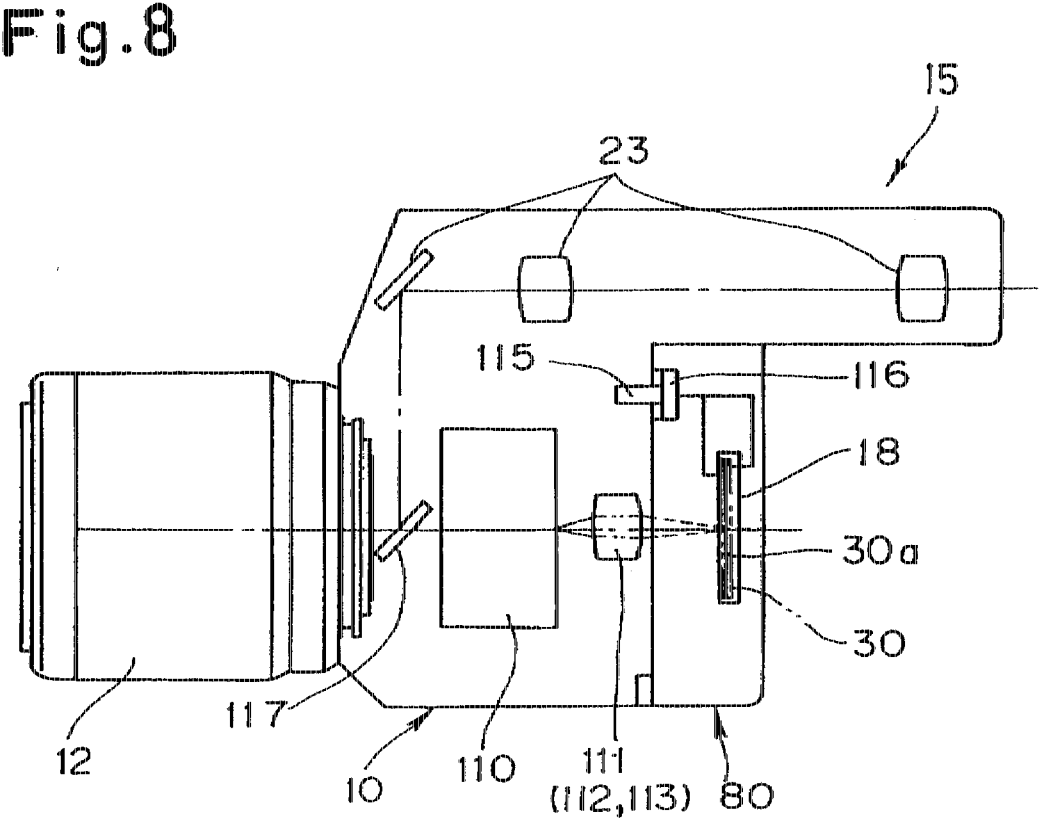
FIG. 8 is a side view of a still video camera having a holder attached thereto.
Figure 9:
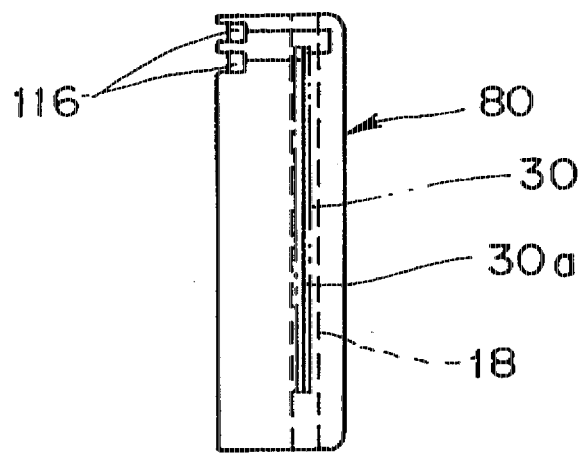
FIG. 9 is a plan view of a holder showing the internal structure thereof.
Figure 10:
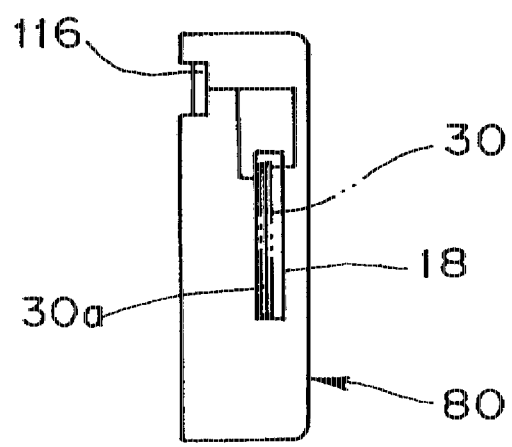
FIG. 10 is a side view of a holder showing the internal structure thereof.

FIGS. 7 and 8 show a still video camera having a holder 80 attached to the camera portion 10, instead of the scanner 11 shown in FIGS. 2 through 6. FIGS. 9 and 10 show the holder 80 when detached from the camera portion.

The holder 80 is provided with a slot 18, similar to the scanner 11, in which the electronic development type recording medium 30 can be disengageably engaged. The light receiving surface 30a of the electronic development type recording medium 30 is, when inserted in the slot 18 of the holder 80, located at the image forming position of the relay lenses 111, 112, 113. The holder 80 is provided with a connector 116 which can be connected to another connector 115 belonging to the camera portion 10 when attached to the camera portion. Namely, the electronic development type recording medium 30 is controlled by a recording medium driving circuit 41 (FIG. 12) provided in the camera portion 10, so that an image of an object photographed by the camera portion is developed on the electronic development type recording medium 30.

As can be seen in FIG. 8, in the camera portion 10, a mirror 117 is provided between the photographing optical system 12 and the color separation prism 110. The light (object image) reflected by the mirror 117 is made incident upon a finder optical system 23. The mirror 117 is of a quick return type which is commonly used in a single lens reflex camera, and is retracted from the photographing optical path when an image of an object is taken. The quick return mirror could be replaced by a stationary half mirror.

Figure 11:
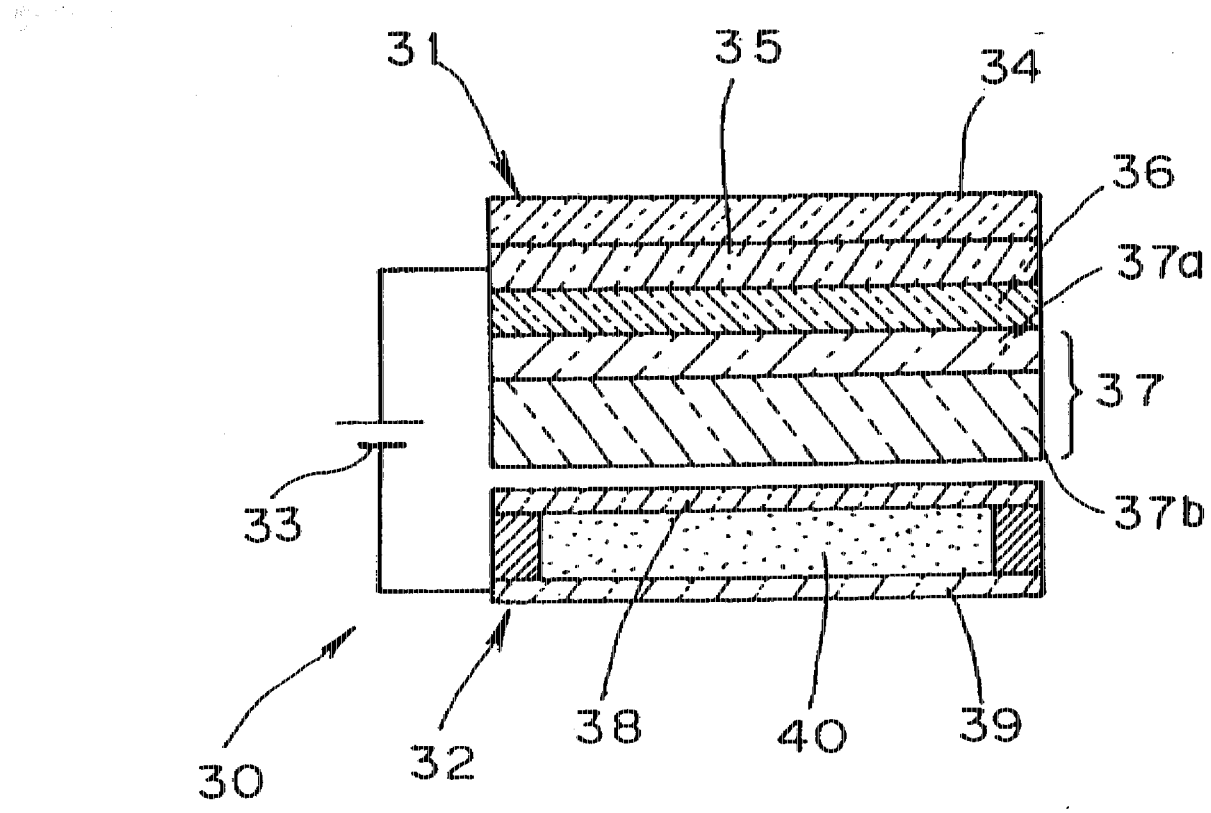
FIG. 11 is a schematic view of an electronic development type recording medium; and, FIG. 12 is a block diagram of a control circuit in a still video camera.

FIG. 11 shows the internal structure of the electronic development type recording medium 30 which is disclosed in Japanese Unexamined Patent Publication No. 5-2280.

The electronic development type recording medium 30 comprises an electrostatic data recording medium 31 and an electric charge holding medium 32. The electrostatic data recording medium 31 has a laminated structure consisting of a substrate 34, an electrode layer 35, an inorganic oxide layer 36 and a photoconductive layer 37. The photoconductive layer 37 is made up of an electric charge generating layer 37a and an electric charge carrying layer 37b laid thereon. The charge holding medium 32 comprises a liquid crystal support 38, a liquid crystal electrode layer 39, and a liquid crystal 40 enclosed between the liquid crystal support 38 and the liquid crystal electrode layer 39. The charge carrying layer 37b of the electrostatic data recording medium 31 is opposed to the liquid crystal support 38 of the charge holding medium 32 with a slight gap therebetween.

Figure 12:
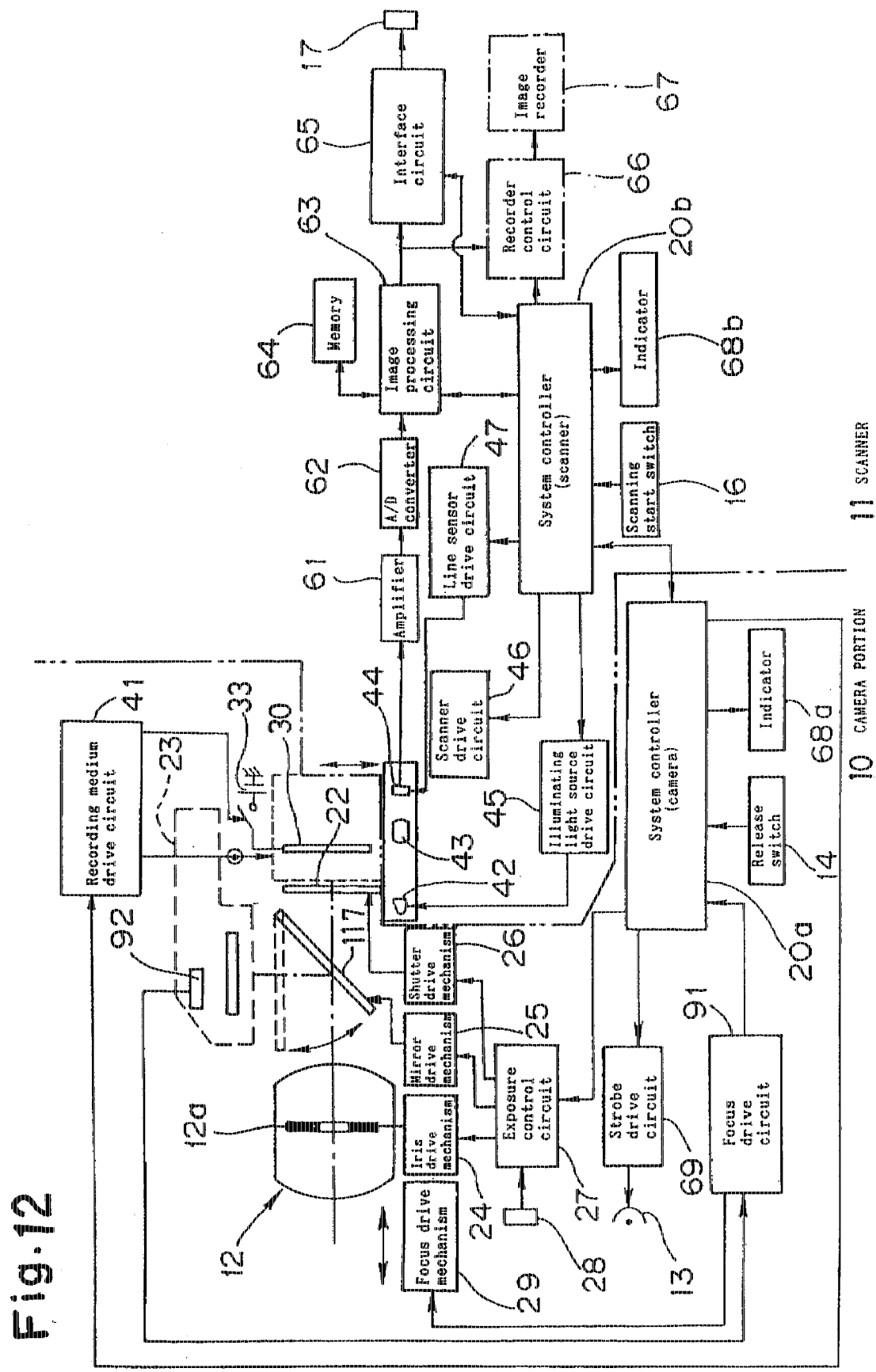

A power source 33 is provided in the camera portion 10. When the electronic development type recording medium 30 is set in a correct position through the slot 18, a closed circuit, as shown in FIG. 11, is completed. The power source 33 is turned ON or OFF by the recording medium driving circuit 41 (FIG. 12). When the power source 33 is ON, a voltage is applied between the electrode layer 35 and the liquid crystal electrode layer 39, i.e. between the electrostatic data recording medium 31 and the charge holding medium 32. In this state, if the electrostatic data recording medium 31 is exposed, the electric charges corresponding to the images are generated in the electrostatic data recording medium 31. Consequently, the intensity of the electric field acting on the liquid crystal 40 varies depending on the electric charges, and hence, a visible image is indicated in the liquid crystal, and the object image is developed. The charge holding medium 32 is made of a dispersive liquid crystal display element, and accordingly, the developed visible image is maintained even after the electric field has been removed. The developed visible image can be erased by heating the dispersive liquid crystal display element to a predetermined temperature by a heater (not shown), thus the same recording medium can be used repeatedly.

FIG. 12 shows a block diagram of a control circuit of a still video camera. In FIG. 12, the scanner 11 is attached to the camera portion 10. The control circuit is mainly comprised of a first portion provided in the camera portion 10 and a second portion provided in the scanner 11.

First and second system controllers 20a and 20b, which are in the form of a microcomputer control, the camera portion 10 and the scanner 11, respectively.

The photographing optical system 12 includes a plurality of lens groups and a diaphragm (stop) 12b. The electronic development type recording medium 30 is located behind the photographing optical system 12. The quick return mirror 117 is provided between the photographing optical system 12 and the recording medium 30. There is a shutter 22 provided between the quick return mirror 117 and the recording medium 30. The finder optical system 23 (located inside finder 15) is provided above the quick return mirror 117. The color separation prism 110 and the relay lenses 111 through 113 are omitted in FIG. 12.

The diaphragm 12a, the quick return mirror 117, and the shutter 22 are driven by an iris drive mechanism 24, a mirror drive mechanism 25, and a shutter drive mechanism 26, respectively. These drive mechanisms are controlled by an exposure control circuit 27. The exposure control circuit 27 operates in accordance with command signals supplied from the system controller 20a. Namely, to control the exposure, the diaphragm 12a is controlled to adjust the aperture thereof by the iris drive mechanism 24, in accordance with the control of the exposure control circuit 27 which is in turn controlled in accordance with output signals supplied from a photo sensor 28. The quick return mirror 117 is normally in a lower position (inclined position) indicated by a solid line in FIG. 12, in which the light transmitted through the photographing optical system 12 is made incident upon the finder optical system 23. Upon photographing, the quick return mirror 117 is moved (rotated) by the mirror drive mechanism 25 to an upper position (horizontal position) indicated by a dotted line, in accordance with control commands from the exposure control circuit 27. The shutter 22, which is normally closed, is opened by the shutter drive mechanism 26 for a predetermined time in accordance with control commands from the exposure control circuit 27, when a picture is taken. Consequently, the light transmitted through the photographing optical system 12 reaches the light receiving surface of the recording medium 30.

The lens groups of the photographing optical system 12 are driven by a focus drive mechanism 29 during an automatic focusing (AF) operation. The focus drive mechanism 29 is controlled by a focus drive circuit 91 which operates in accordance with an AF signal supplied from an AF sensor 92. A signal signalling the completion of the AF operation is sent to the system controller 20a.

A voltage is applied to the electronic development type recording medium 30 in accordance with the control of the recording medium drive circuit 41 through the power source 33. Upon exposure, during the application of the voltage, the image formed by the photographing optical system 12 is developed as a visible image on the recording medium 30. Note that the recording medium drive circuit 41 operates in accordance with command signals supplied from the system controller 20a.

The sub-scanning mechanism 50, provided in the vicinity of the recording medium 30, comprises the light source 42, the scanning optical system 43, and the line sensor 44, as has been previously mentioned. A one-dimensional CCD sensor having 2000 pixels can be used as the line sensor 44. The light source 42 is movable along the front surface of the shutter 22, i.e. the front surface of the recording medium 30, and the line sensor 44 is movable together with the light source 42 along the rear surface of the recording medium 30.

The control of the operation of the light source 42 is carried out by an illuminating light source drive circuit 45, and the reading operation of the pixel signals generated in the line sensor 44 is controlled by the line sensor drive circuit 47. The movement of the sub-scanning mechanism 50 is controlled by a scanner drive circuit 46. Circuits 45, 46 and 47 are controlled by the second system controller 20b. The second system controller 20b corresponds to the control circuit C shown in FIGS. 2, 4, 5 and 6 and is connected to the first system controller 20a in the camera portion 10 through the connectors 114 and 115.

The pixel signals (image signals) read from the line sensor 44 are amplified by an amplifier 61 and are then converted to digital signals by an A/D converter 62. The digital pixel signals are subject to a shading correction, a dropout correction, and a gamma correction etc., in an image processing circuit 63, in accordance with control commands from the second system controller 20b, and are then temporarily stored in a memory 64. The memory 64 has a necessary storage capacity to store data corresponding to one horizontal scanning line or a necessary storage capacity to store data corresponding to one frame. The memory 64 can be provided with an E$^2$PROM in which values corrected by the shading correction etc. can be stored.

The pixel signals (image signals) read from the memory 64 are sent to an interface circuit 65, through the image processing circuit 63, and are subject to a number of predetermined processes such as format conversion, etc. Consequently, the image signals can be input to an external display (not shown) through an output terminal 17. The pixel signals (image signals) output from the image processing circuit 63 are subject to a number of predetermined processes, such as a compression or format conversion, etc., in a recorder control circuit 66. The image signals thus obtained can be recorded on a recording medium, such as an IC memory card in the image recorder 67. The interface circuit 65 and the recorder control circuit 66 operate in accordance with command signals supplied from the system controller 20b.

A release switch 14 is connected to the first system control circuit 20a, so that the photographing operation can be effected by the operation of the release switch 14. An indicator 68a which indicates various set modes of the camera portion 10 and a strobe drive circuit 69 which controls the emission of the strobe light are connected to the first system control circuit 20a.

The scanning start switch 16 is connected to the second system control circuit 20b, so that the image signals developed on the recording medium 30 can be read in accordance with the operation of the scanning start switch 16. An indicator 68b which indicates various set modes of the scanner 11 is connected to the second system control circuit 20b.

The operation of the apparatus mentioned above, according to the present invention, will now be discussed.

When only photographing is required, the holder 80 is attached to the camera portion 10, as shown in FIGS. 7 and 8, so that the recording medium 30 and the recording medium driving circuit 41 are electrically connected through the connectors 115 and 116. Thus an electrical control circuit for the recording medium 30 is completed by the recording medium driving circuit. Namely, when the release switch 14 is depressed, the object image is developed on the liquid crystal 40 of the electronic development type recording medium 30. The recording medium 30 is then attached to the scanner 11 as shown in FIGS. 4 through 6 to read the developed object image, so that the image data thus read can be recorded, for example, on another recording medium or displayed on a display device.

The scanner 11 comprises the holder 80 and the scanning mechanism for scanning the recording medium 30. In other words, the scanner 11 minus the scanning mechanism, including the scanning optical system and the sub-scanning mechanism 42, 42a, 43, 52, 51, etc., and the control circuit C comprises the holder 80.

To record the image data on a recording medium immediately after photographing is completed, the scanner 11 is attached to the camera portion 10, as shown in FIG. 2. Namely, when the scanning start switch 16 is depressed after the object image is developed on the liquid crystal 40 of the recording medium 30 by the operation of the release switch 14, the sub-scanning by the line sensor 44 is performed to read and record the image data on the recording medium.

As can be seen from the above discussion, according to the present invention, the object image is developed on the charge holding medium 32 (dispersive liquid crystal display element) of the electronic development type recording medium 30 by the operation of the release switch 14. The object image thus developed is detected by the sub-scanning of the line sensor 44, and is recorded on the recording medium, such as an IC memory card, etc., by the image recorder 67. The image signal detecting system constituted by the electronic development type recording medium 30 and the line sensor 44 is small and inexpensive in comparison with a two-dimensional CCD sensor (area sensor). Consequently, the present invention can be particularly advantageously applied to a recording and reading apparatus for high definition images. Moreover, since the images are held by the charge holding medium 32, the reading operation of the images by the line sensor 44 can be relatively slow, thus resulting in a simple image processing circuit.

Note that the electronic development type recording medium 30 is not limited to the above mentioned recording medium and can be of any type in which images are electronically developed.

The present invention can be applied not only to a single lens reflex camera but also to a lens shutter type camera. In the application to a lens shutter type camera, it is not necessary to open the shutter 22 again when the scanner is driven, unlike the illustrated embodiment.

The light source 42 can be made of any kind of a light source which emits the parallel light flux toward the recording medium. The scanning optical system 43 can be realized for example by a single lens, a microlens array, a SELFOC lens array, or the like.

The recording medium to be attached to the image recorder 67 can be a magnetic recording medium, such as a hard disc, or an optomagnetic recording medium, such as an optomagneto disc, etc.

It is possible to arrange the line sensor 44 so as to detect light reflected by the electronic development type recording medium 30.

As can be understood from the above discussion, according to the present invention, images can be recorded on the electronic development type recording medium; the images held on the electronic development type recording medium can be read and recorded on the recording medium immediately after the photographing operation; or, the images can be read by attaching the electronic development type recording medium to the scanner, independently of the photographing operation. Namely, the holder and the scanner can be selectively attached to the camera portion in accordance with a need whether only the photographing is necessary or further the recording of the photographing image is necessary.

What is claimed is:

1. An optical image recording and reading apparatus, comprising:

a camera portion having an optical system that forms a focused image of an object at a predetermined position;

a holder that is selectively and separately mounted to said camera portion, said holder having a holding mechanism which holds an electronic development type recording medium, so that a light receiving surface of said electronic development type recording medium is located at said predetermined position, said electronic development type recording medium comprising a medium on which a visible image is formed upon photographing without any need for chemical treatment after exposure; and, a scanner that is selectively and separately mounted to said camera portion, said scanner having a holding mechanism which holds said electronic development type recording medium, so that a light receiving surface of said electronic development type recording medium is located at said predetermined position, said scanner having an image reading mechanism that reads an image developed on said electronic development type recording medium held by said holding mechanism of said scanner.

2. The optical image recording and reading apparatus according to claim 1, wherein said electronic development type recording medium is detachably attached to said holding mechanism of either one of said holder or said scanner.

3. The optical image recording and reading apparatus according to claim 1, wherein said predetermined position is located outside said camera portion.

4. The optical image recording and reading apparatus according to claim 1, wherein said electronic development type recording medium comprises a transparent type recording medium through which light can pass.

5. The optical image recording and reading apparatus according to claim 1, said scanner further comprising a terminal which externally outputs a signal corresponding to said image read by said image reading mechanism.

6. The optical image recording and reading apparatus according to claim 1, wherein said electronic development type recording medium is provided with an electrostatic data recording medium in which electric charges corresponding to said image are produced, and a charge holding medium on which a visible image corresponding to said electric charges is formed and which can hold said visible image.

7. The optical image recording and reading apparatus according to claim 6, wherein said charge holding medium comprises a dispersive liquid crystal display element.

8. The optical image recording and reading apparatus according to claim 1, wherein said camera portion is provided with electrical connecting terminals for connecting said camera portion to one of said holder and said scanner, said holder and said scanner being provided with electrical connecting terminals which are selectively connected to said electrical terminals of said camera portion.

9. An optical image recording and reading apparatus comprising:

a camera portion having an optical system that forms a focused image of an object at a predetermined position;

a holder that is selectively mounted to said camera portion, said holder having a holding mechanism which holds an electronic development type recording medium, so that a light receiving surface of said electronic development type recording medium is located at said predetermined position, said electronic development type recording medium comprising a medium on which a visible image is formed upon photographing without any need for chemical treatment after exposure; and a scanner that is selectively mounted to said camera portion, said scanner having a holding mechanism which holds said electronic development type recording medium, so that a light receiving surface of said electronic development type recording medium is located at said predetermined position, said scanner having an image reading mechanism that reads an image developed on said electronic development type recording medium held by said holding mechanism of said scanner, said scanner comprising:

a light source which emits light to be made incident upon said electronic development type recording medium;

a scanning optical system that forms an image of said recording medium illuminated by said light source on an image forming surface;

a line sensor that is located on said image forming surface of said scanning optical system;

a sub-scanning mechanism that moves said line sensor along said image forming surface and on said image forming surface in a direction different from a longitudinal direction of said line sensor; and means for outputting image signals produced in said line sensor.

10. The optical image recording and reading apparatus according to claim 9, wherein said recording medium comprises a transparent type recording medium through which light emitted by said light source can pass, and wherein said light source and said line sensor are disposed on opposite sides of said recording medium.

11. The optical image recording and reading apparatus according to claim 9, wherein said sub-scanning mechanism moves said line sensor in a direction perpendicular to said longitudinal direction thereof.

12. The optical image recording and reading apparatus according to claim 9, wherein said sub-scanning mechanism moves said light source and said scanning optical system together with said line sensor.

13. The optical image recording and reading apparatus according to claim 12, wherein said sub-scanning mechanism holds said light source at an area outside of said image forming area of said electronic development type recording medium when photographing operation occurs.

14. An optical image recording system which uses an electronic development type recording medium, said electronic development type recording medium being a medium on which a visible image is formed upon photographing without any need for chemical treatment after exposure, said optical image recording system comprising an optical device which forms an image of an object, a holder and a scanner selectively and separately mounted to said optical device, wherein said holder and said scanner each include a holding mechanism which holds said electronic development type recording medium at a position where a focused image formed by said optical device is located, and wherein said scanner is further provided with an image reading mechanism which reads an image developed on said electronic development type recording medium, which is held by said holding mechanism provided on said scanner.

* * * * *

UNITED STATES PATENT AND TRADEMARK OFFICE
CERTIFICATE OF CORRECTION

PATENT NO. : 5,708,472
DATED : January 13, 1998
INVENTOR(S) : T. MORISAWA et al.

It is certified that error appears in the above-identified patent and that said Letters Patent is hereby corrected as shown below:

On the cover page of the printed patent, paragraph [56] References Cited, U.S. Patent Documents, column 2, line 2, insert the following:

--- 5,424,156  6/1995  Aoki et al.  430/59---.

On the cover page of the printed patent, paragraph [56] References Cited, Foreign Patent Documents, column 2, line 4, insert the following:

---  52,280    1/1993   Japan    G03G 5/14
     5,150,251 6/1993   Japan    G02F 1/1343
     0,327,236 8/1989   E.P.O.   H04N 5/50
     5-24,706  4/1993   Japan    H04N 5/222
     6,313,894 11/1994  Japan    G02F 1/135---.

Signed and Sealed this

Twenty-second Day of December, 1998

Attest:

BRUCE LEHMAN

*Attesting Officer*       *Commissioner of Patents and Trademarks*